Patented Sept. 3, 1946

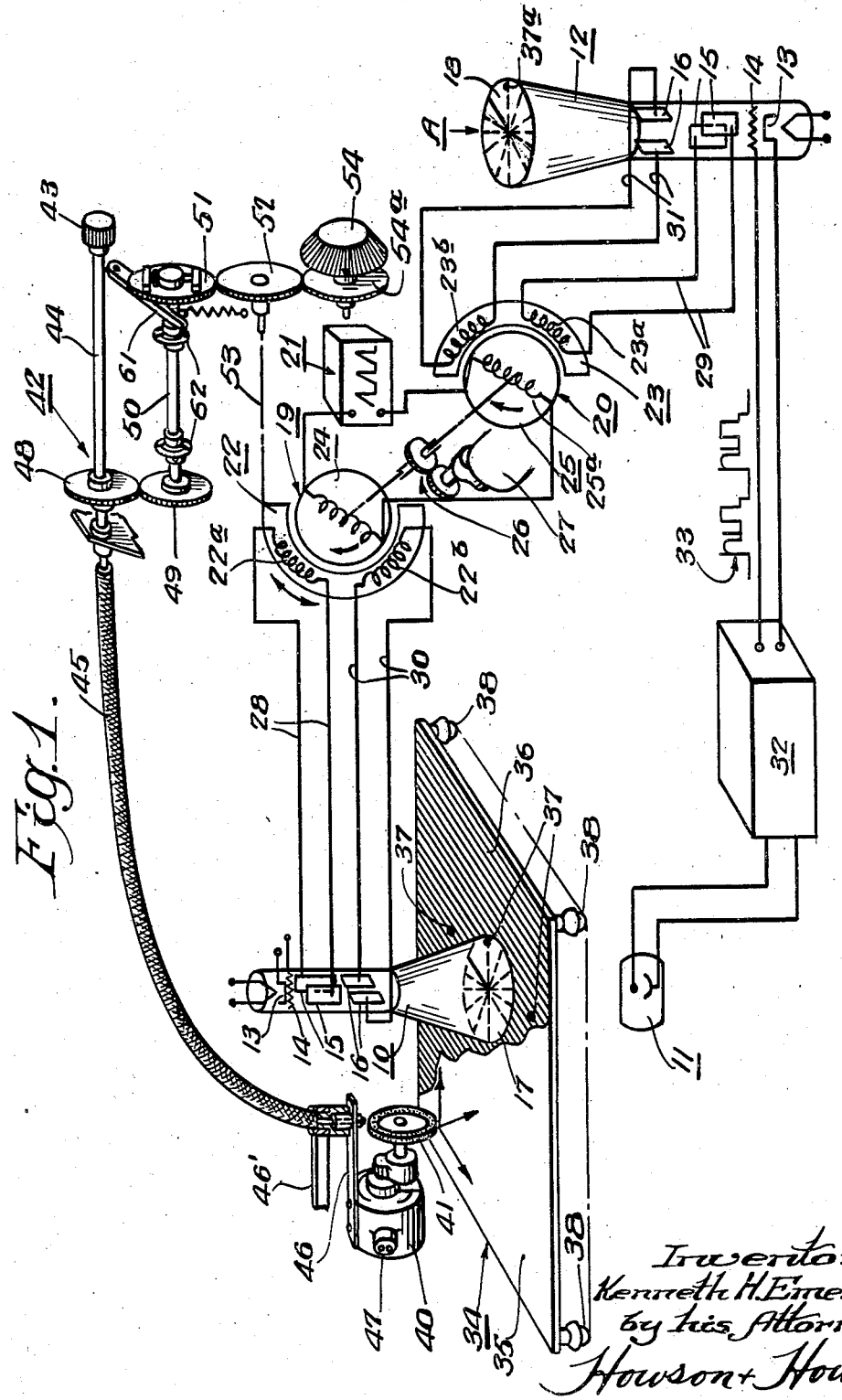

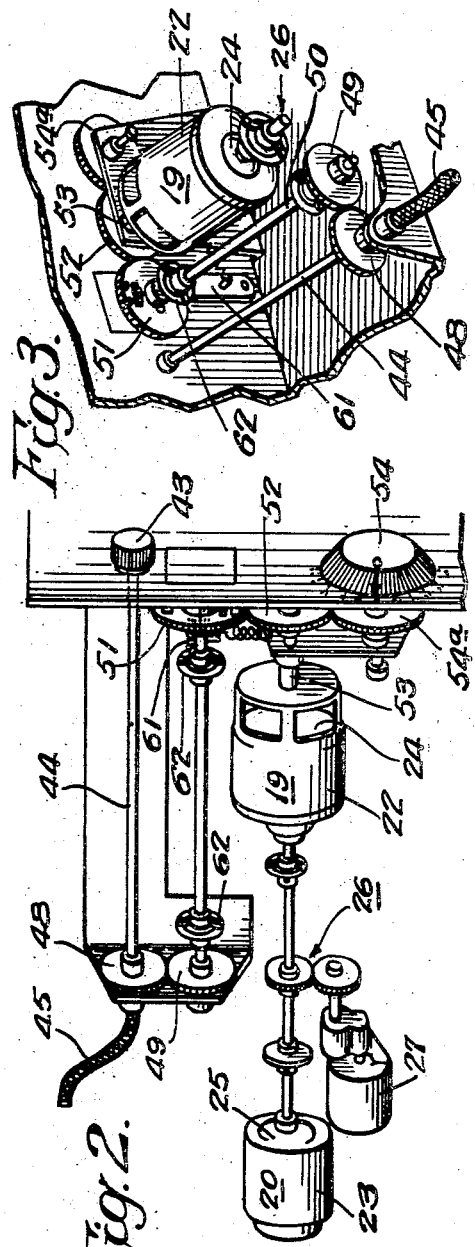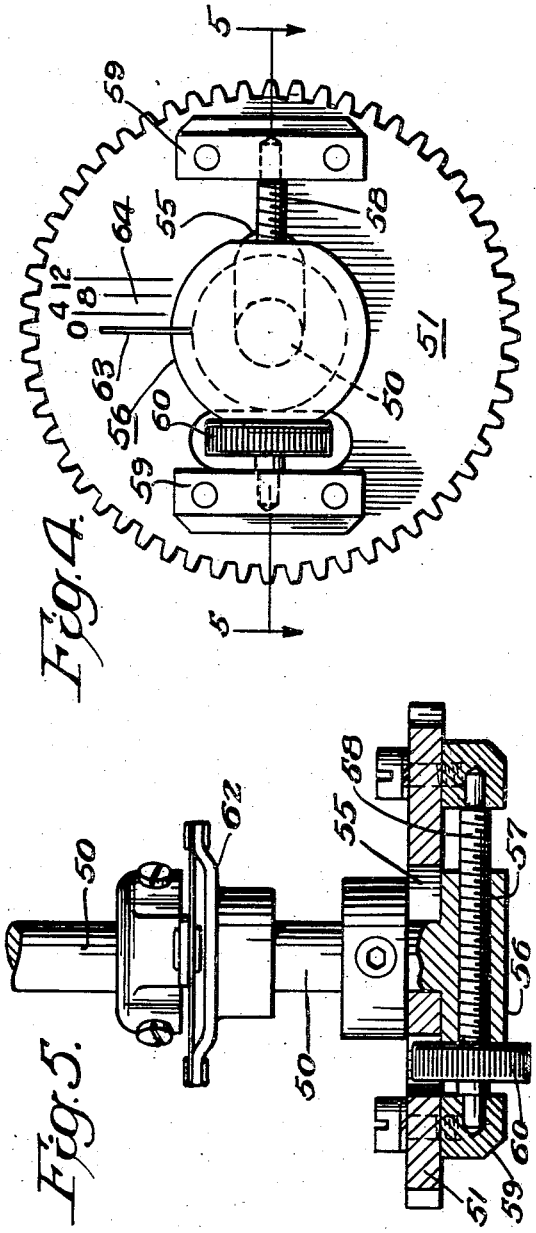

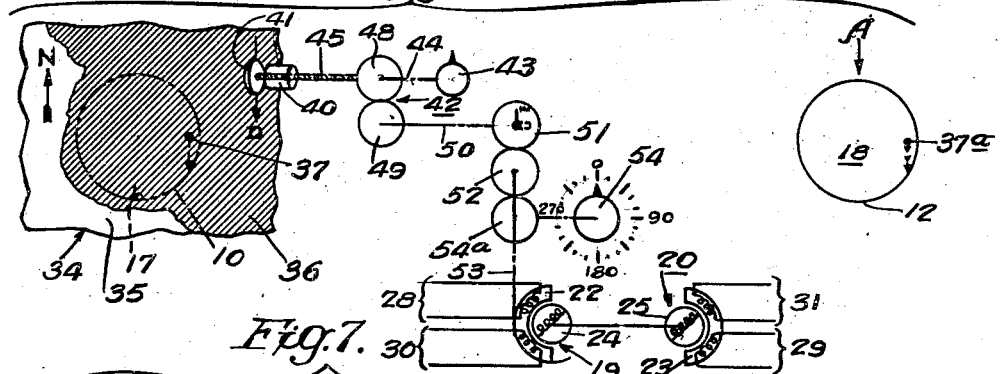
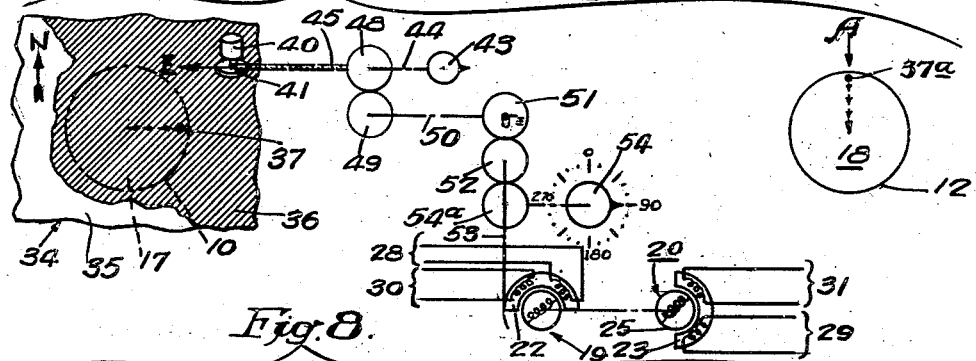
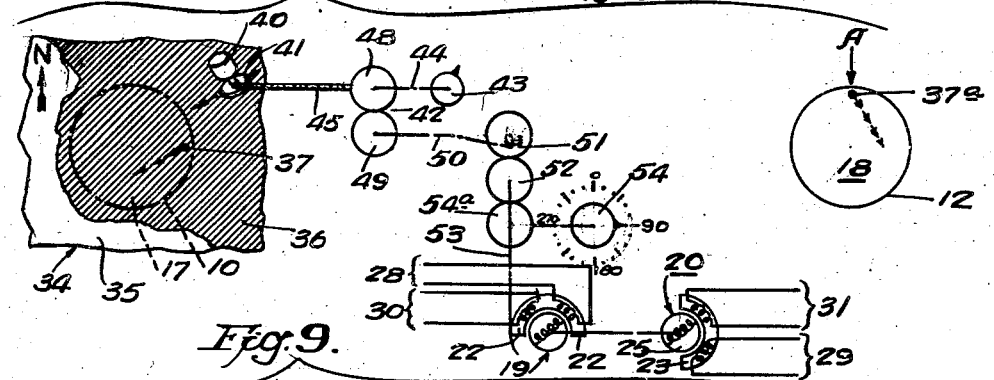
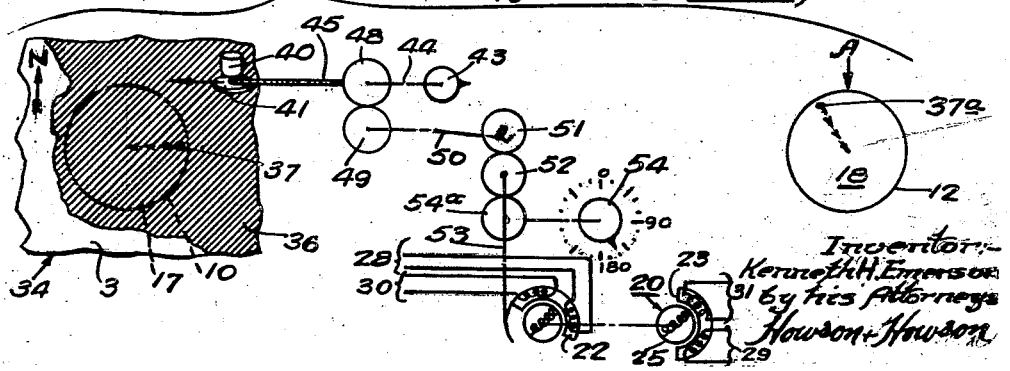

2,406,751

UNITED STATES PATENT OFFICE 2,406,751

DEMONSTRATION APPARATUS

Kenneth H. Emerson, Philadelphia, Pa., assignor, by mesne assignments, to Philco Corporation, Philadelphia, Pa., a corporation of Pennsylvania Application May 27, 1944, Serial No. 537,556

13 Claims. (Cl. 35—1)

1

The present invention generally relates to location and range finding equipment and particularly to a system for pictorially indicating the azimuth and range of a point or detail in a simulated geographical area. More specifically, the invention pertains to a system functioning to simulate various navigational conditions so that such conditions may be reproduced for comparison with actual conditions affecting the operation of radio detection and range finding equipment in use in an aircraft or on a ship.

The invention, in its more limited aspect, contemplates the provision of a system for demonstrating the use of radio detection and range finding equipment, the system being such that the demonstration can be carried out on the ground so that it becomes unnecessary to be aboard an aircraft or a ship to observe the functions of the equipment under various navigational conditions.

It is an important object of the invention to provide a system of the character mentioned utilizing means capable of reproducing various conditions which exist in actual navigation in order that observation of, or training in the use of, radio detection and range finding equipment may be realistic.

The invention is particularly characterized by the provision of a system including combined electrical and mechanical features which cooperate to produce so-called picture signals and to simulate aircraft or ship movement, speed, direction and drift effects with respect to the produced signals.

Other important objects and advantages of the invention will become apparent from the following detailed description based upon the accompanying drawings, in which:

Fig. 1 is a diagrammatic representation of the system of the invention;

Fig. 2 is a perspective view illustrating a portion of the mechanism incorporated in the system to control the same, and viewed from the top;

Fig. 3 is a perspective view of certain parts shown in Fig. 2 but viewed from the back;

Fig. 4 is a front elevation of the gear device which may be used as a possible means to simulate wind drift or the like;

Fig. 5 is a sectional detail taken on line 5—5 of Fig. 4;

Figs. 6 and 7 are diagrammatic explanatory representations illustrating the operation of the system when drift simulation is not introduced therein; and

2

Figs. 8 and 9 are views similar to Figs. 6 and 7 but illustrate the operation of the system when drift simulation is introduced in the system.

The system as generally represented in Fig. 1, may be used to simulate navigational conditions which affect the flight of an aircraft in the air or the course of a ship at sea. However, for the purpose of disclosure, the system will hereinafter be described as used to simulate aircraft flight, it being understood that the description likewise applies if the system is to be used to simulate the course of a ship at sea.

The system, as diagrammatically shown in Fig. 1, is capable of synthetically producing and reconstituting picture signals for observation, and of simulating aircraft flight, speed, direction and drift effects in relation to such signals as are observed.

The production and reconstitution of picture signals are obtained by means of an electronic device basically comprising a projector tube 10, a photo-electric cell 11 and a picture tube 12. The projector tube 10 and the picture tube 12 preferably are of the polar or radial scanning type, and each may include the usual cathode or electron emitter 13, control grid 14, and pairs of deflecting plates 15 and 16, one pair of plates 15 causing the so-called vertical deflection of the electron beam and the other pair of plates 16 causing the so-called horizontal deflection of said beam. The mechanical arrangements of the parts constituting the tubes 10 and 12 are disposed in the usual known manner to produce synchronous polar scanning of the screens of the said tubes.

By "polar scanning" reference is had to that type of scanning wherein the electron beam traces successive radial lines on the screen of the cathode ray tube, the direction of the line being changed in successive radial scans, so that after a complete polar cycle the screen is completely scanned, as if by a rotating vector having its origin at the center of the screen.

Polar scanning may be accomplished by associating with the tubes 10 and 12, suitable scanning signal generating means, such as rotating transformers 19 and 20 and a sweep generating device 21 of known structure capable of producing saw-tooth waves. As schematically represented in Fig. 1, the rotary transformers comprise stator elements 22 and 23 and rotor elements 24 and 25, respectively, the stator element 22 of one transformer 19 having sets of windings 22a and 22b electrically associated with the deflecting plates of projector tube 10, and the stator element 23 of the other transformer 20 having sets of windings 23a and 23b electrically associated with deflecting plates of the picture tube 12. The rotor elements 24 and 25 of the respective transformers 19 and 20 are mechanically associated as indicated at 26 and are driven in synchronism, for example, by means of an electric motor 27. The windings 24a and 25a of said rotor elements are connected in series across the output of the saw-tooth wave generator 21.

Also as diagrammatically illustrated in Fig. 1, it is to be noted that one set of windings 22a in the stator 22 of the transformer 19 is connected, as indicated by leads 28, to the vertical deflecting plates 15 of the projector tube 10, and the corresponding set of windings 23a in the stator 23 in the transformer 20 is connected, as indicated by the leads 29, to the vertical deflecting plates 15 of the picture tube 12; whereas, the other set of windings 22b in the stator element 22 of transformer 19 is electrically connected, as indicated by leads 30, to the horizontal deflecting plates 16 of the projector tube 10, and the corresponding set of windings 23b in the stator element 23 of the transformer 20 is electrically connected, as indicated by the leads 31, to the horizontal deflecting plates 16 of the picture tube 12. It will be appreciated that since the rotor elements 24 and 25 are mechanically coupled to operate in synchronism, the voltage variations and polarity changes in both tubes 10 and 12 are synchronous. Rotation of each rotor element applies varying deflecting voltages to the pairs of deflecting plates of the associated tube, the voltages applied to the respective pairs of plates varying differentially to effect the polar scanning.

The photo-electric cell 11 is disposed to collect the light from the screen 17 of the projector tube 10. The picture signal generated in the cell 11 is fed into an amplifier 32, the output wave 33, the characteristics of which may be generally as shown, being applied to the grid-cathode circuit 14—13 of the picture tube 12 to control the intensity of the cathode ray beam thereof.

In order to produce picture signals which closely resemble those generated under actual conditions, means simulating a geographical area, which means is in the form of a specially devised map 34, is interposed between the projector tube 10 and photo-electric cell 11. This map preferably consists of clear portions 35 representing land areas and opaque portions 36 representing sea areas. The map may be and preferably is constructed of clear glass on which the sea areas are painted by applying a suitable black emulsion to one surface of the glass. Detailed points to be observed may be drawn on the sea areas of the map by removing the black emulsion with a sharp pointed instrument, thus leaving transparent spots localized on the map as indicated at 37. These spots may be removed, if desired, by covering them with paint, india ink, or the like.

It is pointed out that, in practice, the treated surface of the map 34 is preferably placed as close as possible to the screen 17 of the projector tube 10 so that the light spot on said screen will be concentrated on that point of the map over which said spot appears.

From the foregoing it will be understood that when opaque portions of the map 34 underlie the moving light spot produced by the projector tube 10, the light emitted by the latter is intercepted so that no light falls on the photo-electric cell 11 and the screen 18 of the picture tube 12 is correspondingly dark. However, where a transparent portion of the map underlies the moving light spot, the transmitted light affects the photo-electric cell 11 which, in turn, affects the picture tube 12 so that a corresponding light spot 37a is reconstituted on the screen 18 of said picture tube.

In practicing the invention, the map 34 may conveniently be supported on suitable carriage means 38 so that the map may be moved in all directions in a plane paralleling the plane of the projector tube screen 17, either by hand or through operation of power driven means which preferably comprises an electric motor 40 provided with a rubber rimmed wheel 41, or the like, adapted to frictionally engage the map surface. In this manner, it will be appreciated that rotation of the wheel 41 will cause the map to move linearly in the direction of the wheel rotation. It will also be appreciated that the direction of the map movement may be changed if the angular position of the wheel 41 is changed in relation to the map surface, as is indicated by the group of arrows in Fig. 1.

For this purpose, the motor 40 is preferably mounted to rotate bodily about an axis perpendicular to the plane of the map surface. This rotation of the motor 40 may be, and preferably is, obtained by manipulation of a suitable remote control device 42 such as diagrammatically illustrated in Fig. 1, and including a manually operable knob 43 connected by means of a shaft 44 to a flexible cable 45 which in turn is connected to the map driving motor, for example, by means of an arm 46 attached thereto. The motor-supporting arm 46 is rotatably supported by a stationary support 46'. By providing a controlled device of this type, it will be understood that when the knob 43 is rotated manually either in clockwise or counter-clockwise direction, the rotation is transmitted to the body of the motor through the shaft 44, flexible cable 45 and arm 46, thereby changing the angular position of the wheel 41 with respect to the map surface.

Since the movement of the map 34 in relation to the scanning screen 17 of the projector tube 10 is intended to simulate the flight of an aircraft, the change in movement from one direction to another should be continuous and progressive and, accordingly, the map driving motor 40 and its control device 42 are preferably associated and mounted in such a manner that the wheel 41 does not leave the surface of the map during rotation of the motor as a unit. To accomplish this result, the connection between the flexible cable 45 and the motor carried arm 46 is such that the manipulation of the knob 43 causes the map motor 40 to rotate as a unit about an axis at right angles to the map at the point of tangency between said map and the motor driven wheel 41.

As hereinbefore stated the movement of the map 34 in relation to the screen 17 of the projector tube 10, simulates the aircraft flight and since, for practical reasons, the overall dimensions of the map must be limited to a reasonable size, the rotation of the map moving wheel 41 must be relatively slow for simulation of aircraft flight at actual flying speeds. For example, it has been found that with a map measuring approximately 10 by 8 inches, and covering a flight area approximately 340 miles north and south and 170 miles east and west, good results are obtained if the map driving wheel rotates at the rate of approximately one revolution per hour for a simulated aircraft speed of 200 miles per hour. In such case the wheel may have a diameter of approximately 2 inches.

In order to simulate variations in the speed of the aircraft, suitable control means 47, such as a rheostat or the like, may be associated with the map motor 40 so that by increasing or decreasing the motor speed, a corresponding increase or decrease in the aircraft speed will be indicated on the picture tube viewing screen 18. In fact, the aircraft speed at any position of the map motor speed adjustment, may be determined by computing the rate at which the reconstituted picture signal moves over a given number of miles, which may be graphically represented on the viewing screen 18 of the picture tube 12.

In the system as shown in the drawings, provision is also made to simulate the direction in which the aircraft movement is taking place and, for that purpose, the system includes an azimuth control mechanism. The term "azimuth" is used herein in the ordinary known sense as applied to navigation, and insofar as the picture tube 12 is concerned, the "zero-azimuth" position is preferably fixed, as indicated at A in the drawings, to coincide with a straight vertical line extending from the top edge to the center of the viewing screen 18 of said picture tube.

In the embodiment illustrated in the drawings, the azimuth control mechanism comprises a gear 48 fixed onto the knob carrying shaft 44 which controls the bodily rotation of the map motor 40 to vary the angular position of the map driving wheel 41 with respect to the map 34. The gear 48 meshes with a second gear 49 carried on one end portion of a stub shaft 50 having, at its other end portion, a gear 51 which in turn meshes with a gear 52 mechanically connected as represented at 53, to the stator element 22 of the rotating transformer 19 associated with the projector tube 10.

Thus, with particular reference to Figs. 6 and 7, it will be understood that as the map driving wheel 41 changes its angular position in relation to map 34 when the knob 43 is manipulated, the stator element 22 of the rotary transformer 19 correspondingly changes its position in relation to the rotor element 24 of said transformer due to the gear connections between said stator element and knob carrying shaft 44. The adjustment of stator element 22 serves to selectively advance or retard the scanning of tube 10 relative to the scanning of tube 12, by changing the relative timing of the scanning signals applied to the two tubes. This has the same effect as if the picture tube 12 were rotated to bring the reconstituted picture signal in line with the fixed "zero-azimuth" position A thus simulating veering of the aircraft to point in the direction of the detail being observed on the map. Since the scanning action in each of the tubes 10 and 12 simulates the rotation of a vector, the effect of displacing the stator element 22 is to relatively displace the imaginary vectors in the tubes, which produces the same effect as if the tube 12 were rotated about its axis. After the above described adjustment has been made, the picture signal reconstituted on the viewing screen 18 will move straight down the "zero-azimuth" line indicating that the aircraft is travelling straight towards the detail being observed on the map.

Preferably, as shown in Fig. 2, a dial 54 is conveniently associated, by means of a gear 54a, with the azimuth control mechanism to provide visual indications, in degrees, of the angular positions of stator element 22. In practice it is found desirable to so adjust the map motor 40 and the stator element 22 and the mechanical connections therebetween that, if no drift effect is introduced in the system, the setting of the dial 54 at the 0° calibration indicates that the aircraft is travelling due north or in "zero-azimuth" position A; the setting of the dial at the 90° calibration indicates that the aircraft is travelling due east; the setting of the dial at the 180° calibration indicates that the aircraft is travelling due south; and the setting of the dial at 270° calibration indicates that the aircraft is travelling due west. With such an arrangement, it will be understood that flights in all directions can be simulated by turning the azimuth control mechanism from 0° to 360°.

The system so far described, is capable of producing and reconstituting picture signals and of simulating the aircraft movement, speed and direction of flight. As described hereinafter, the present invention contemplates further the provision of means to simulate the effect of wind drift or the like.

As illustrated in the drawings, drift simulation may be obtained by so mounting the gear 51 on shaft 50 that said gear and shaft may be relatively adjusted to vary the eccentricity of the gear in relation to the shaft. For that purpose, the gear 51 may be formed with an elongated slot 55 (Figs. 4 and 5) adapted to receive the corresponding end portion of the shaft 50 thus providing for lateral sliding movement of said end portion with respect to the center of the gear. Said end portion of the shaft preferably terminates with an enlarged head 56 having a bore 57 extending transversely therethrough and adapted for screw threaded engagement with a pin 58 having its end portions projected beyond said head and engaged in suitable thrust bearing 59 on the face of the gear. The pin 58 preferably carries a fixed knurled nut 60 to facilitate rotation of the pin thus causing the head 56 on the end of the shaft 50 to travel along said pin and accordingly adjust the eccentricity between said shaft and the gear 51.

In order to assure positive engagement of the adjustable eccentric gear 51 with its companion gear 52, a spring-urged bearing 61 may be provided to resiliently force said adjustable gear in a direction toward the mentioned companion gear, and the shaft 50 may comprise a plurality of sections interconnected by means of suitable flexible couplings 62 which allow the shaft 50 to adapt itself to the eccentric setting of the gear 51. As shown in Fig. 4, a pointer 63 may be provided on the shaft head 56 to register with a calibrated scale 64 on the face of the gear 51 for visually indicating in degrees, the eccentricity of adjustment between said shaft and gear.

In practice, when the adjustment is set at 0°, the shaft 50 is centered with respect to the gear 51 and no drift simulation exists, so that once the map motor 40 and its map driving wheel 41 have been adjusted to reproduce the picture signal at the "zero-azimuth" position A on the picture tube 12, the signal will not deviate from said position, but, as hereinbefore stated, will move straight down the "zero-azimuth" line, thus indicating the plane is headed straight toward the detail being observed on the map 34.

When the drift adjustment is set off the 0° line, for instance on the 4°, 8° or 12° line (Fig. 4), the shaft assumes an off-center or eccentric position with respect to the gear 51, the degree of eccentricity depending on the setting.

Such drift simulating means effectively varies the driving ratio between gears 51 and 52, and causes a variation to occur in the normal synchronized setting between the map motor 40 and the adjustable stator element 22 of the projector tube rotary transformer 19 so that, although the azimuth control mechanism has been set to simulate veering of the aircraft to point towards the detail being observed on the map, the picture signal reconstituted on the viewing screen 18 of the picture tube 12 will appear as gradually deviating from the "zero-azimuth" position A, which is what happens when the ordinary radio detection and range finding equipment is used under actual circumstances. It will be noted that this effect is produced by varying the scanning tube 10 relative to the scanning of tube 12 by a different amount than the normal variation when the drift adjustment is set at 0°.

The operation of the system may be better understood by referring to Figs. 6 to 9. As shown in these figures, a map having at least one detail 37, drawn thereon, is placed in position to be scanned by the projector tube screen 17. By adjusting the position of the map motor 40 through manipulation of the knob 43, the driving wheel 41 moves the map 34 so that area thereof containing said detail 37 is brought in alignment with the screen 17 of the picture tube 10, whereupon the light emitted by said tube is picked up by the photo-electric cell 11, which acts on the picture tube 12 to reconstitute the picture signal or light spot 37a on the viewing screen 18 in the manner hereinbefore stated.

Assuming that the top portion of the map is "north" as indicated by the arrow N, and the setting is as illustrated in Fig. 6, so that the motor driven wheel 41 moves the map in the direction of arrow-head D, that is in the southerly direction which simulates aircraft flight directly to the "north," then the map detail 37 within the area being seen by the screen 17 of the projector tube 10, moves in the same direction as the map so that said detail 37, as well as the picture signal or light spot 37a reproduced on the viewing screen 18 of the picture 12, will move off said screens as indicated by the broken arrows in said Fig. 6.

If the picture signal or light spot 37a, reconstituted on the viewing screen 18, appears off the "zero-azimuth" position A, say at "90° azimuth" which in the example given herein represents "east," then the observer will know that the simulated aircraft is not headed for the map detail being observed. By further manipulating the knob 43, the position of the map driving wheel 41 and of the stator element 22 of the rotary transformer 19 associated with the projector tube 10, may be regulated until the signal on the picture tube viewing screen 18 appears at the "zero-azimuth" position A, thus indicating that the simulated aircraft has veered to point toward the map detail under observation. This latter condition is illustrated in Fig. 7 wherein turning of the knob 43, from the position shown in Fig. 6, until the dial 54 is set on the 90° calibration, has caused the stator element 22 and the map driving wheel 41 to rotate in synchronism through an angle of 90°, the wheel then causing the map to move in the direction of arrow-head E or in the westerly direction to simulate aircraft flight to the "east" or toward the detail 37, and the stator element 22 then causing the light spot 37a on the viewing screen 18 to move in line with the "zero-azimuth" position A. When the reconstituted picture signal or light spot 37a moves in the "zero-azimuth" position down a straight vertical line toward the center of the viewing screen 18, as represented by the broken arrows in said Fig. 7, it is an indication, as hereinbefore mentioned, that the simulated aircraft is moving directly towards the detail being observed on the map and when the persistence of said signal or light spot arrives at the center of the viewing screen, it is an indication that the simulated aircraft has reached and is over said detail.

Under actual conditions, if a cross wind is present, the aircraft moves forward at an angle and the nose does not point in the direction of motion. This condition is reproduced in the system of the invention, if the drift simulating mechanism is set to operate as hereinbefore explained, that is, if the gear 51 is adjusted off center. As represented in Fig. 8, when the drift simulating mechanism is in operation, the picture signal or light spot 37a reconstituted on the viewing screen 18 deviates from the "zero-azimuth" position A and is seen to lead away from the center of said screen in the manner indicated by the broken arrows in Fig. 8. For example, if as supposed in Fig. 8, the setting is such that the simulated flight direction is to the east and the simulated drift is such that the simulated aircraft moves laterally to the left or in the northeasterly direction, these conditions appear on the picture tube screen 18 by a movement of the reconstituted picture signal or light spot 37a to the right of the "zero-azimuth" position A.

The operation of the system to simulate this drift effect will be understood more clearly from a consideration of Fig. 8, wherein the gear 51 is shown as being eccentrically adjusted so that, although the turning of the knob 43 from the position illustrated in Fig. 6 sets the dial 54 of the 90° calibration causing the stator element 22 to rotate through a 90° angle, the map driving wheel 41 is rotated only through a portion of such 90° angle, say through a 60° angle. The rotation of the stator element 22 to the "90°-azimuth" causes the light spot 37a on the viewing screen 18 to assume a position in line with the "zero-azimuth" position A, but due to the fact that the wheel 41 has an angular position different from that of said stator element, the map 34 and, consequently, the detail 37 thereon move obliquely so that said light spot 37a deviates from the "zero-azimuth" as is indicated by the broken arrows in Fig. 8. Although the drift condition may be corrected by periodic adjustment of the control knob 43, to repeatedly bring the light spot 37a in the "zero-azimuth" portion, it is preferable to determine the amount of drift and compensate therefor by so setting the azimuth control mechanism as to simulate movement of the aircraft directly towards the map detail being observed. The amount of drift may be determined by plotting the reconstituted picture signal in miles and degrees on polar coordinate paper, the angle between the zero-degree line and the line connecting all points plotted, as measured by a protractor, being the amount or angle of drift in degrees.

Thus, in the example used herein, the plotting of the reconstituted picture signal would disclose a drift angle of 60° so that by turning the knob 43 from the position shown in Fig. 8 until the dial 54 is rotated through an additional 60° angle as represented in Fig. 9, the drift effect should be corrected and compensated for, since, as illustrated in said Fig. 9 the final setting so locates the stator element 22 that the light spot 37a moves along a radius 60° to the left of the "zero-azimuth" position and the wheel 41 rotates through a corresponding angle. Accordingly, the map 34 is then driven to simulate the true movement of the simulated aircraft directly toward the detail 37 which is indicated on the viewing screen 18 by movement of the light spot 37a directly toward the center of said screen.

It is to be noted that the gear 51, when eccentrically adjusted, will simulate during a complete revolution two zero wind drift conditions and two maximum wind drift conditions which is exactly what happens during actual flying. Therefore, in the example set out herein and illustrated in Figs. 6 through 9, although the gear 51 may be eccentrically adjusted, no "wind drift" will be indicated on the viewing screen 18, if the map motor is set to simulate a due "north" or "south" flight.

From the foregoing description it will be appreciated that the system of the present invention provides an arrangement whereby various navigational conditions may be reproduced synthetically to simulate the effects of such conditions for comparison with like effects of actual conditions on radio detection and range finding equipment used in aircraft or on ships, and it will be recognized that the system is especially adaptable to teach personnel the use and operation of such equipment.

While a possible embodiment of the system has been shown and described herein, it is to be understood that the invention is not limited to such embodiment but that constructional changes may be made within the scope of the appended claims.

I claim:

1. In a system of the character described, means simulating a geographical area and having different light response characteristics, means for producing a picture signal corresponding to details in said area simulating means, a picture reconstituting device, means for supplying said picture signal to said device, scanning signal generating means associated with said picture signal producing means and with said picture reconstituting device for controlling and synchronizing the operations thereof, and means operatively associated with said scannnig signal generating means for varying, at will, the scanning of said picture signal producing means relative to the scanning of said picture reconstituting device.

2. In a system of the character described, means simulating a geographical area and having different light response characteristics, means for producing a picture signal corresponding to details in said area simulating means, a picture reconstituting device, means for supplying said picture signal to said device, scanning signal generating means associated with said picture signal producing means and with said picture reconstituting device for controlling and synchronizing the operations thereof, and means operatively associated with said scanning signal generating means for selectively advancing and retarding the scanning of said picture signal producing means relative to the scanning of said picture reconstituting device.

3. In a system of the character described, means simulating a geographical area and having different light response characteristics, means for producing a picture signal corresponding to details in said area simulating means, a picture reconstituting device, means for supplying said picture signal to said device, scanning signal generating means associated with said picture signal producing means and with said picture reconstituting device for controlling and synchronizing the operations thereof, and means operatively associated with said scanning signal generating means for changing the relative timing of the scanning signals applied to said picture signal producing means and said picture reconstituting device.

4. In a system of the character described, a map having different light response characteristics, means for producing a picture signal corresponding to details of said map, a picture reconstituting device, means engageable with said map for moving the same in relation to said picture signal producing means to simulate movement of a craft toward a fixed detail on the map, means for supplying said picture signal to said device, scanning signal generating means associated with said picture signal producing means and with said picture reconstituting device for controlling and synchronizing the operations thereof, and drift simulating means associated with said scanning signal generating means for varying, at will, the scanning of said picture signal producing means relative to the scanning of said picture reconstituting device.

5. In a system of the character described, a map having different light response characteristics, means including a cathode ray tube and a photo-electric cell associated with the map for producing a picture signal corresponding to details of said map, a cathode ray tube for reconstituting the picture signal for observation, means for supplying said picture signal to the last-mentioned cathode ray tube, scanning signal generating means associated with said cathode ray tubes for controlling and synchronizing the operations thereof, and means operatively associated wtih said scanning signal generating means for varying, at will, the scanning of said first-mentioned cathode ray tube relative to the scanning of said last-mentioned cathode ray tube.

6. In a system of the character described, a map having different light response characteristics, means including a cathode ray projector tube and a photo-electric cell associated with the map for producing a picture signal corresponding to details of the map, a cathode ray picture tube for reconstituting the picture signal for observation, means for supplying said picture signal to said picture tube, scanning signal generating means associated with said tubes for controlling and synchronizing the operations thereof, and means operatively associated with said scanning signal generating means for selectively advancing and retarding the scanning of said projector tube relative to the scanning of said picture tube.

7. In a system of the character described, a map having different light response characteristics, means including a cathode ray projector tube and a photo-electric cell associated with the map for producing a picture signal corresponding to details of said map, a cathode ray picture tube for reconstituting the picture signal for observation, means for supplying said picture signal to said picture tube, scanning signal generating means associated with said tubes for controlling and synchronizing the operations thereof, and means operatively associated with said scanning signal generating means for changing the relative timing of the scanning signals applied to said tubes.

8. In a system of the character described, a map having different light response characteristics, means including a cathode ray projector tube and a photo-electric cell associated with the map for producing a picture signal corresponding to details of said map, a cathode ray picture tube for reconstituting the picture signal for observation, means engageable with said map for moving the same in relation to the picture signal producing means to simulate on the picture tube movement of a craft toward a fixed detail on the map, scanning signal generating means associated with said tubes for controlling and synchronizing the operations thereof, and drift simulating means operatively associated with said scanning signal generating means for changing the relative timing of the scanning signals applied to said tubes.

9. In a system of the character described, a map having different light response characteristics, means including a cathode ray projector tube and a photo-electric cell associated with the map for producing a picture signal corresponding to details of said map, a motor having means driven thereby and engageable with the map for moving the same relatively to said picture signal producing means to simulate movement of a craft toward a fixed detail on the map, a cathode ray picture tube for reconstituting the picture signal for observation, means for supplying said picture signal to said picture tube, scanning means including stator and rotor elements associated with each tube to control and synchronize the operations of the tubes, control means for adjusting said motor and one of said stator elements so as to fix the direction of the simulated movement on the picture tube, and drift simulating means incorporated in said control means and operable to produce deviation from said direction.

10. In a system of the character described, a map having different light response characteristics, means including a cathode ray projector tube and a photo-electric cell associated with the map for producing a picture signal corresponding to details of said map, a motor having means driven thereby and engageable with the map for moving the same relatively to said picture signal producing means to simulate movement of a craft toward a fixed detail on the map, a cathode ray picture tube for reconstituting the picture signal for observation, means for supplying said picture signal to said picture tube, scanning means including stator and rotor elements associated with each tube to control and synchronize the operations of the tubes, control means for adjusting said motor and one of said stator elements so as to fix the direction of the simulated movement on the picture tube, and drift simulating means including an eccentrically adjustable gear incorporated in said control means and operable to produce deviation from said direction.

11. In a system of the character described, means simulating a geographical area and having different light response characteristics, means including a cathode ray tube for producing a picture signal corresponding to the details of the simulated area, means for effecting relative movement between the simulated area and said tube, thereby to simulate movement of a craft relative to said area, a cathode ray picture tube, means for supplying said picture signal to said picture tube, a source of scanning signals, means for applying said scanning signals to said tubes so as to effect synchronous polar scanning thereof, and means for changing the relative timing of the scanning signals applied to the respective tubes, thereby to simulate drift of the craft whose movement is being simulated.

12. In a system of the character described, means simulating a geographical area and having different light response characteristics, means including a cathode ray tube for producing a picture signal corresponding to the details of the simulated area, means for effecting relative movement between the simulated area and said tube, thereby to simulate movement of a craft relative to said area, a cathode ray picture tube, means for supplying said picture signal to said picture tube, a source of scanning signals, means for applying said scanning signals to said tubes so as to effect synchronous polar scanning thereof, said last-named means including rotary induction devices each having a rotor and a stator, manually-operable means for varying the direction of relative movement between said simulated area and said first tube, and for correspondingly varying the position of the stator of one of said induction devices, whereby the direction of the simulated craft movement is indicated on said picture tube, and means for changing the positional variation of the said stator to simulate drift of the craft whose movement is being simulated.

13. In a system of the character described, a map having different light response characteristics, means including a cathode ray tube for producing a picture signal corresponding to the details of said map, means for effecting relative movement between said map and said tube, thereby to simulate movement of a craft relative to details of the map, a cathode ray picture tube, means for supplying said picture signal to said picture tube, scanning means associated with the respective tubes to control and synchronize the operations of the tubes, manually-operable means for varying the direction of relative movement between said map and said first tube and for adjusting the scanning means associated with said first tube so as to fix the direction of simulated movement on the picture tube, and adjustable means associated with said last means for introducing variable simulated drift affecting the simulated movement on the picture tube.

KENNETH H. EMERSON.